Nov. 29, 1938.　　　R. T. KILLMAN　　　2,138,379
NOZZLE
Filed Aug. 10, 1936
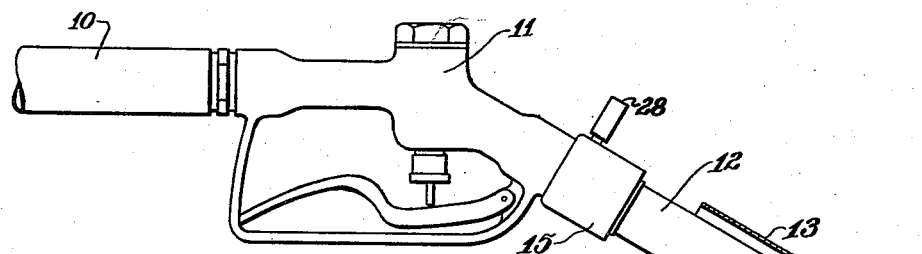
Fig. 1.
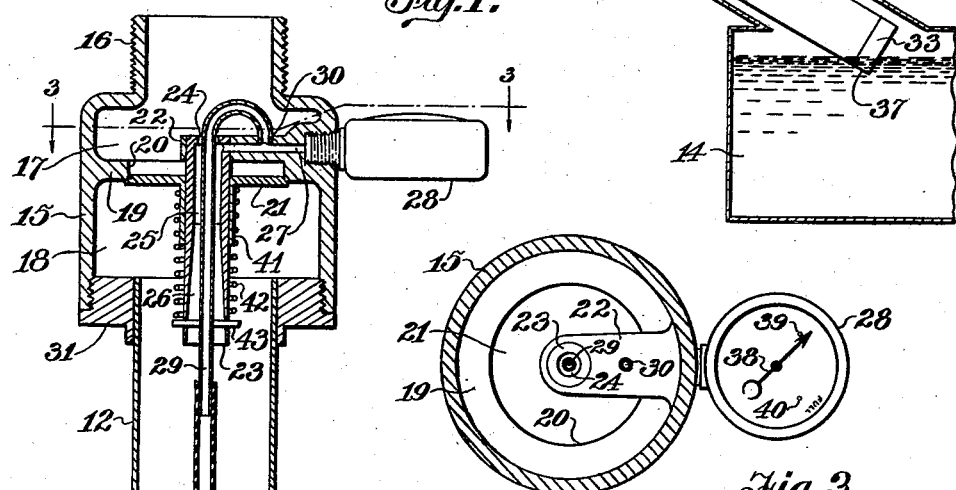
Fig. 2.
Fig. 3.
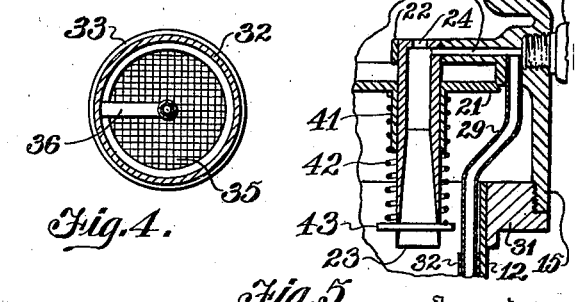
Fig. 5.
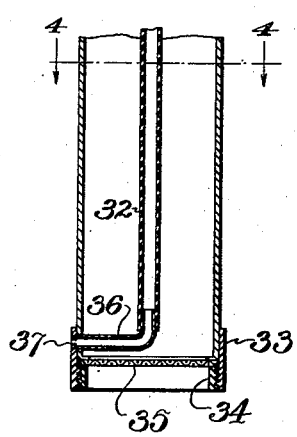
Fig. 4.
Inventor
Robert T. Killman
By
Attorney Patented Nov. 29, 1938

2,138,379

UNITED STATES PATENT OFFICE 2,138,379

NOZZLE

Robert T. Killman, Nashville, Tenn.

Application August 10, 1936, Serial No. 95,131

17 Claims. (Cl. 226—66)

This invention relates to nozzles for use in filling containers with liquids and more particularly to gasoline dispensing nozzles used by filling stations in connection with a dispensing pump and a length of flexible hose for filling automobile gasoline tanks and its general object is to provide an easily recognizable and reliable signal to the operator that will indicate to him when the tank has been filled to the desired level so that the tank will not be inadvertently overfilled and gasoline allowed to flow over the car and to be wasted or cause dangerous conditions as to fire hazard.

The general principle of the device is that a portion of the gasoline flow through the nozzle is caused to pass through a small aspirator or Venturi-tube while the main flow is caused to pass through a spring loaded valve. This valve causes the pressure head at the inlet of the aspirator to remain approximately constant regardless of changes in the amount of the total flow of liquid through the device into the tank and the aspirator will thus be operative from a mere trickle up to full flow conditions. The suction aperture of the aspirator is connected to a suction pipe which passes down the nozzle to a point close to its discharge opening. A vacuum gauge or indicator communicates with the upper portion of this suction pipe and indicates the difference in vacuum in the suction pipe when its lower end is open to the atmosphere and when it is submerged in the liquid.

The fact that the indicator is operative throughout a wide range of flow conditions is particularly advantageous in filling automobile tanks having relatively long and angular filler pipes wherein the nozzle is not long enough or flexible enough to pass through the filler pipe into the gasoline tank itself. Under these conditions it is the level of the gasoline in the filler pipe itself which causes the indicator to operate. Since these filler pipes are usually only slightly larger than the nozzle itself the level of liquid in the filler pipe changes very rapidly if the flow from the nozzle is at all large. If an attempt is made to fill a tank under these conditions with the nozzle supplying a full flow, the tank will almost invariably be over filled, even with a properly operating indicator, since the time required by the operator to note the operation of the indicator and shut off the flow of gasoline is in excess of that required to fill and run over the filler pipe. Thus it will be seen that it is of the greatest advantage to be able to shut down on the flow of gasoline into the tank and to be able to do this without interfering with the proper operation of the indicator. Accordingly one of the objects of this invention is to provide an indicator of the type described which is operative over a wide range of flow conditions.

Another difficulty which arises in filling tanks having long and angular filler tubes is that although the flow of gasoline is shut off at the proper time to prevent over filling the tank or filler pipe, there remains in the nozzle itself a considerable quantity of gasoline, which, when the nozzle is withdrawn slightly will drain into the filler pipe and in some cases overrun it. Accordingly it is among the objects of this invention to provide, in a nozzle of the type described, means for preventing the liquid entrapped in the nozzle after the flow has been shut off, from draining into the tank. This result is accomplished by placing over the discharge end of the nozzle a relatively fine mesh screen. This screen offers little resistance to the liquid flow but, when the flow has been shut off the surface tension, etc., of the liquid prevents the entrance of air into the nozzle and the entrapped liquid is prevented from draining into the tank or filler pipe. The screen also performs the additional function of filtering the liquid as it leaves the nozzle and enters the automobile tank, thus greatly minimizing the danger of foreign substances such as grit, dirt, fibers or particles of the flexible hose, etc., from entering the tank.

An illustrative embodiment of the invention is shown in the accompanying drawing, wherein:

Figure 1 is a side elevational view of the nozzle and its valved conduit showing the manner in which it is used in instances where it is desired to fill a tank substantially full;

Figure 2 is an enlarged view of the nozzle in section;

Figure 3 is a sectional view thereof on line 3—3 of Figure 2;

Figure 4 is a sectional view on line 4—4 of Figure 2; and

Figure 5 is a fragmentary sectional view showing an alternative arrangement of the suction pipe.

Referring now in more detail to the drawing the numeral 10 indicates the usual flexible conduit communicating with a liquid reservoir or gasoline meter pump, not shown, and which is connected at its other end to a conventional type hand operated valve structure 11 controlling the flow of liquid from the reservoir or pump through the valve to the nozzle 12.

The nozzle 12 is shown in Figure 1 inserted into the filler pipe 13 of the usual automobile gasoline tank 14 which it is desired to fill.

In this invention there is interposed between the nozzle 12 and the valve structure 11 the casing 15 shown in more detail in Figures 2 and 3.

Casing 15 is of substantially cylindrical form and is provided with a threaded extension 16 for the purpose of threadedly engaging the valve structure 11. Casing 15 is provided at its lower end with the threaded bushing 31 into which the nozzle 12 is fixed. The nozzle 12 may be either rigid or flexible as preferred. Casing 15 is divided into two chambers, an upper chamber 17 and a lower chamber 18, by means of a partition 19. The partition 19 has an aperture 20 centrally located therein which aperture is normally closed by means of the valve 21. Projecting inwardly from one side of the casing 15 toward the center thereof is the projection 22. An aperture is provided in the inner end of the projection 22 into which is fixed the aspirator tube 23, the aspirator tube 23 being located axially of and concentric to the casing 15. The aspirator tube 23 is provided at its upper end with an inlet hole 24, the diameter of which is relatively very small as compared to the upper chamber 17, the lower chamber 18 and the aperture 20 in the partition 19. The opening 24 leads into a slightly larger duct 25 which in turn leads into a tapered duct 26, this structure being one of the forms which the aspirator tube may take. Other forms of aspirators are well known and may be substituted for the exact construction here shown.

The valve 21 previously mentioned is provided with a hub 41 designed to slide freely on the outside surface of the aspirator tube member 23. A coil spring 42, one end of which bears against a pin 43 located in holes formed in the lower end of the aspirator tube 23 and whose other end bears against the valve 21 normally urging valve 21 against its seat in the partition 19. A duct 27 formed in the projection 22 communicates at one end with the channel 25 of the aspirator tube 23 at a point where opening 24 joins the channel 25, and at the other end with a vacuum gauge 28. Communicating with the duct 27 at a point between the aspirator tube 23 and the gauge 28 is the tube 29. For purposes of illustration I have shown two alternative methods of arranging this tube 29. In Figure 2 I have shown tube 29 communicating with duct 27 at the point 30 and having been bent to a half circle passing through the opening 24, channel 25 and 26, to a point somewhat below the lower end of the aspirator tube 23. Opening 24, channels 25 and 26, must of course, in this arrangement be made large enough to allow the passage of liquid around tube 29. In the alternative arrangement shown in Figure 5, the tube 29 communicates with the duct 27 by passing through the partition 19 and is bent as shown to pass down into the nozzle 12 outside of the aspirator tube 23 to a point somewhat below the lower end thereof.

In any case, the tube 29 is joined to the tube 32, which may be either rigid or flexible according to whether the nozzle 12 is rigid or flexible. The tube 32 passes down inside the nozzle 12 to a point near the discharge opening thereof where it is joined to the short bent tube 36 opening to the side of nozzle 12 through the small opening 37 in sleeve 33, described later, the diameter of which opening is small as compared to the opening through tubes 36, 32 and 29. The size of the openings through these tubes is made large enough that fluid meets with very little resistance in passing through them, while opening 37 is small enough that the fluid does encounter considerable difficulty in passing through it. Since opening 37 is still large enough to permit air to enter freely, no considerable vacuum can be formed by the aspirator in duct 27 even though tubes 36, 32 and 29 may be already full of fluid from a previous operation of the device, as long as opening 37 is not covered by the fluid in the tank being filled. This arrangement prevents false indications which otherwise might occur when the device is first put in operation, due to the presence of fluid remaining in the passages from a previous operation. Opening 37 is made in a very thin wall and therefore has practically no length where fluid may remain and cause a false indication.

The nozzle 12 at the lower end is provided with the interiorly threaded sleeve 33 into which is placed the circular screen 35 which is held in place against the end of the nozzle 12 by the exteriorly threaded ring 34. The vacuum gauge 28 is of conventional construction except that its dial is not calibrated, but is provided with two stop pins 39 and 40 which limit the movement of the hand 38. Near the pin 40 is placed the word "full" or any such suitable marking. The pointer 38 normally rests against the pin 39. I prefer to preload the gauge in such a way that a vacuum of around 5 or 10 inches of mercury is required to cause pointer 38 to leave the pin 39 and also that the pointer 38 shall reach the pin 40 with a vacuum of around 15 to 20 inches of mercury. It is to be understood however, that these values are merely illustrative and that I am not bound thereby but may use any suitable values therefor.

The operation of the invention is as follows:

The nozzle 12 is inserted into the filler pipe of the tank to be filled. In some cases the nozzle will pass entirely through the filler pipe and project into the tank itself, while in other cases the nozzle will enter the filler pipe but for a short distance due to bends in the filler pipe. In either case the location of the opening 37 determines the level at which the operator will be signalled to stop the flow.

After the nozzle has been placed in the filler pipe the valve structure 11 is operated to allow liquid to flow into the tank. If valve 11 is opened only slightly all of the liquid will pass through the aspirator since the aperture 20 in partition 19 is normally closed by valve 21. If valve 11 is opened wider the passage through the aspirator will not be sufficient to accommodate the increased flow and pressure will be built up in the upper chamber 17. When this pressure has become sufficient, the valve 21 will be forced from its seat against the tension of spring 42. As valve 11 is opened still more, valve 21 will be forced farther from its seat and there will be maintained in chamber 17 a fairly constant pressure. I prefer to adjust spring 42 so that this pressure is maintained at a point just high enough to provide for satisfactory operation of the aspirator, for example five to ten pounds per square inch.

The action of valve 21 and spring 42 in maintaining this pressure in chamber 17 constant, regardless of the amount (above a certain minimum) that valve 11 is opened, allows the aspirator to be operative over practically the whole range of flow conditions to which the nozzle may be subjected in practice.

The passage of liquid through the aspirator causes a flow of air to take place through opening 37, tubes 36, 32 and 29, duct 27, and into the aspirator. As long as opening 37 is exposed to the atmosphere this air flow may take place freely and no vacuum will be formed, or at least, not enough to cause pointer 38 to leave the pin 39.

If however, opening 37 becomes submerged in liquid, as for instance when the level of liquid in the tank has risen sufficiently to cover opening 37, a vacuum will be formed in duct 27 and the upper portions of tube 29, due to the fact that the liquid cannot pass through the small opening 37 fast enough to take the place of the air being evacuated from these passages by the aspirator. This vacuum will be sufficient to cause pointer 38 to leave pin 39 and to move to pin 40, which movement will constitute a signal to the operator that the tank has been filled to the desired level.

Since the pressure in chamber 17 and therefore the flow through the aspirator remain fairly constant throughout wide variations in flow through the nozzle, the indicating means will be operative throughout all conditions of flow to which a nozzle is ordinarily subjected in actual practice, and the operator may fill the tank at any desired rate and still be assured of the proper operation of the signal device.

The valve 21 also takes the place of the check valve commonly used in nozzles to prevent the draining of the hose when the motor and pump are not running.

The screen 35 prevents the liquid entrapped in nozzle 12 from draining into the tank or filler pipe and therefore the filler pipe will not be overrun even though the flow be stopped after the filler pipe has been filled to a level very close to its upper end. Screen 35 may be removed for cleaning or replacement very easily by unscrewing and removing the ring 34.

It will be understood that the particular embodiment of the invention disclosed herein is of an illustrative character and is not restrictive of the scope and meaning of the following claims.

Having thus described the invention, what is claimed as new, and desired to be secured by Letters Patent, is:

1. In a tank filling nozzle, a liquid flow operated vacuum pump, means providing a bypass passage around said pump for accommodating variations in liquid flow, a pressure operated valve normally closing said passage, a tubular member extending from the pump to the level to which it is desired to fill the tank, and a pressure indicating device communicating with said duct.

2. In a device for filling receptacles with fluent materials, means providing a main fluid passage, yieldable fluid pressure operated means normally closing the passage, a flow operated suction pump communicating with the passage, said pump having a fluid passage very small as compared to the main fluid passage, a suction tube associated with the pump, and a pressure responsive indicator connected to the suction tube.

3. In a nozzle for filling tanks or other containers with liquids, a flow operated suction pump having a liquid passage therethrough, means providing a bypass passage around the pump for accommodating liquid flow in excess of the capacity of said pump, said bypass passage being very large as compared to the passage through the pump, a pressure operated, spring loaded valve normally closing said bypass passage, a suction pipe extending from the pump to the level to which it is desired to fill the tank, and a vacuum pressure indicator communicating with said suction pipe.

4. In a tank filling nozzle a casing having a plurality of fluid flow passages, one of said passages constituting an aspirator, the other of said passages constituting a bypass, for accommodating fluid flow in excess of the capacity of said aspirator, a spring loaded pressure operated valve normally closing the bypass, a suction pipe associated with the aspirator and having an opening at the level to which it is desired to fill the tank, a pressure responsive indicator communicating with the suction pipe.

5. The elements in combination defined in claim 4 further characterized by the fact that the passage constituting the aspirator is very small relative to the bypass passage.

6. In a tank filling nozzle the combination with a manually operable cut-off valve, of a casing, a liquid discharge pipe communicating with the casing, a radial projection projecting from the interior surface of the casing inwardly to its center, an aspirator tube, having a fluid flow passage through it, located in the projection, axially of and concentric to the casing, a circular valve seat formed integrally with the casing and surrounding the aspirator tube, said valve seat defining a bypass around the aspirator tube, said bypass having an area relatively very large as compared to the liquid flow passage through the aspirator, a valve slidably mounted upon the aspirator tube as a guide and normally cooperating with the valve seat to close the bypass, a coil spring urging the valve against the valve seat, said projection having a suction passage formed therein, said passage communicating with the aspirator tube, a suction tube communicating with the suction passage, and passing down interiorly of the liquid discharge pipe and communicating with an opening in the side of the liquid discharge pipe at a point adjacent its discharge opening, a vacuum indicator communicating with the suction passage, and a screen mesh disposed over the discharge opening of the discharge pipe.

7. The elements in combination defined in claim 6 in which the suction tube extends within the fluid flow passage of the aspirator tube.

8. A liquid handling nozzle comprising a casing having inlet and outlet openings, an apertured partition between said openings dividing said casing into an upper and a lower chamber, a spring loaded, pressure operated valve normally closing the aperture in said partition, an aspirator having inlet and outlet openings and a suction opening, said aspirator having its inlet openng communicating with the upper one of said chambers and its outlet opening communicating with the lower of said chambers, a tube communicating with the suction opening of the aspirator and having an opening located near the outlet opening of the casing, and a vacuum gauge communicating with said tube.

9. In a device for filling receptacles with fluent materials, a casing provided with fluid flow passages, fluid flow actuated vacuum producing means positioned within the casing, pressure operated means for shunting a portion of the fluid flow around the vacuum producing means; a suction pipe associated with the vacuum producing means and having a port open to the atmosphere; and a vacuum pressure responsive indicating means communicating with the suction pipe.

10. In a device for filling receptacles with fluent materials, a casing provided with a fluid passage having an aspirator located therein; a suction tube communicating at one end with the aspirator, the other end of said tube being restricted by a relatively thin wall having an aperture therethrough, said aperture being small as compared to the tube; and pressure responsive indicating means connected to said tube.

11. In a device for filling receptacles with fluent materials, a casing having a fluid passage therethrough; a fluid flow actuated suction pump located in said passage; a suction pipe connected at one end with the pump; a restrictive member for the other end of the suction pipe, said member comprising a thin wall having a small opening therein, said open being relatively small as compared to the inside diameter of the suction pipe; and a pressure responsive indicator communicating with the suction pipe.

12. In a nozzle, a casing provided with an inlet chamber and an outlet chamber, spring loaded valve means for maintaining a constant pressure difference between said chambers, and an aspirator joining said chambers, and a vacuum indicator operably joined to the aspirator.

13. In a nozzle, a casing provided with an inlet chamber and an outlet chamber, spring loaded valve means for maintaining a constant pressure difference between said chambers, an aspirator joining said chambers, a suction tube connected to said aspirator, and a vacuum indicator joined to said aspirator, and to said suction tube.

14. In a nozzle, a casing provided with an inlet chamber and an outlet chamber, spring loaded valve means for maintaining a constant pressure in said inlet chamber, an aspirator joining said chambers, a vacuum pressure responsive indicating means connected with said aspirator, and an inlet pipe joined to said aspirator and said indicating means, said pipe having a passage therethrough of sufficient size to allow liquid to pass therethrough at a sufficient rate to prevent said aspirator from producing an appreciable vacuum, and a relatively short restriction positioned near the end of said pipe and having an orifice of such size that air will, and liquid will not pass therethrough at a sufficient rate to prevent said aspirator from producing an appreciable vacuum.

15. In a nozzle, a fluid flow actuated vacuum producing means, a suction pipe connected to said means, said pipe having a passage therethrough of sufficient size to allow liquid to pass therethrough at a sufficient rate to prevent said means from producing an appreciable vacuum, a relatively thin restriction positioned near the end of said pipe and having an orifice therein of such size that air will and liquid will not pass therethrough at a sufficient rate to prevent said means from producing an appreciable vacuum, and a vacuum pressure operated indicator operably joined to said vacuum producing means, and to said suction pipe.

16. In a nozzle, a casing providing a plurality of chambers, means for maintaining a substantially constant pressure difference between said chambers, an aspirator joining said chambers, and an indicator joined to said aspirator.

17. In a device for delivering fluids into tanks or other containers, a casing providing a chamber through which the fluid is caused to flow, means for maintaining a substantially constant fluid pressure in the chamber, an aspirator connected to the chamber, and means operable by the aspirator to indicate that the fluid in the container has reached a predetermined level.

ROBERT T. KILLMAN.